No. 654,513.  
G. H. BROOKS.  
BADGE PIN.  
(Application filed May 26, 1900.)  
Patented July 24, 1900.
(No Model.)
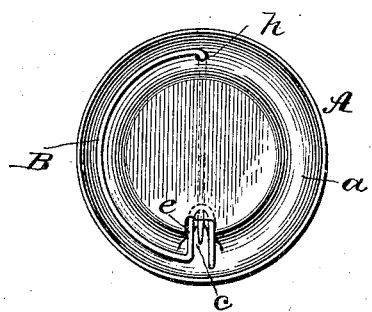
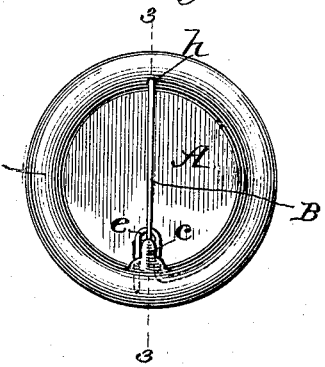
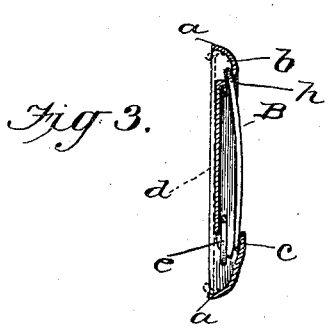
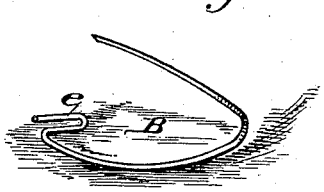
WITNESSES:  
Jos. A. Ryan  
Edw. W. Byrn.
INVENTOR  
George H. Brooks.  
BY Munn & Co  
ATTORNEYS

UNITED STATES PATENT OFFICE.

GEORGE H. BROOKS, OF LOUISVILLE, KENTUCKY.

BADGE-PIN.

SPECIFICATION forming part of Letters Patent No. 654,513, dated July 24, 1900.

Application filed May 26, 1900. Serial No. 18,059. (No model.)

*To all whom it may concern:*

Be it known that I, GEORGE H. BROOKS, of Louisville, in the county of Jefferson and State of Kentucky, have invented a new and useful Improvement in Badge-Buttons, of which the following is a specification.

My invention is in the nature of a backing frame and pin for holding small photographs, campaign mottoes, and for badges generally; and it consists of the peculiar construction and arrangement of the pin and the backing or frame of the badge, whereby the device is very simply and cheaply made and the pin is strongly and firmly secured in place with a spring action, as will be hereinafter fully described with reference to the drawings, in which—

Figure 1 is a front view of the backing piece or pin. Fig. 2 is a rear view of the same. Fig. 3 is a section on line 3 3 of Fig. 2. Fig. 4 is a detail of the pin.

In the drawings, A represents the backing-plate, of thin sheet metal or any other material, which is stamped out, preferably in circular shape, by a die which forms a circumferential groove $a$ on one side and a corresponding bead $b$ on the other. The outer wall or flange of the backing A forms a rim to retain a photograph, a card with a motto, or any picture, design, or symbol of any character, as shown by dotted lines at $d$, said photograph, picture, or design constituting the badge proper being retained by having the outer flange of the groove $a$ crimped down upon its edges, so as to hold it in place and form a marginal frame for the same.

B is the pin. This is formed of a single piece of spring-wire, one portion of which is fashioned into a pointed pin proper and the other portion is curved to a semicircular form and terminates at the end in an inturned loop $e$, formed by bending the wire and then returning it on itself.

The backing A is provided at the line of junction between the groove and the central flat portion with a raised tongue $c$, which is pressed outwardly from the grooved side, so as to form a catch for the pin to hook under, and which tongue is concave on the under side and points inwardly toward the center. The slot in the backing formed by the punching out of the tongue I utilize to form one of the anchorage-points for the pin, and at a diametrically-opposite point in the groove there is a hole $h$, which forms another anchorage-point.

In fixing the pin to the backing the point of the pin is passed through the hole $h$ from the rear until the semicircular portion drops into the groove, and the loop $e$ is inserted through the slot beneath the tongue $c$, and the loop is allowed to extend up toward the center of the backing sufficiently far to grasp the metal and hold it, being slightly bent or canted toward the backing, so as to bind thereagainst and clamp the same firmly. This also gives the effect to throw the point of the pin outwardly with a spring action, and the pin is thus firmly held to the back with a long semicircular bearing and with a torsional spring effect that makes a very cheap, simple, strong, and practical connection.

I am aware that a pin has been attached to a grooved backing by simply having an eye bent on its end and made to pass through a hole in the grooved back and grasp a small portion of the metal.

I am also aware that a pin has had a curved shank portion which was retained in the groove of the backing by clips which were bent over the curved shank.

I am aware that an open-back button has had a pin secured within a detachable rim, in which the pin-base was constructed as a semicircular bend having an inwardly-projecting loop bent in the same, which loop formed the anchorage or catch for the point of the pin. My invention is distinctive in the following features: The button has a solid or closed back, and the loop which is bent in the pin-base does not form an anchorage or retaining-catch for the pin-point, but is pressed flat against the solid backing to clamp or clench it to the back-plate and stiffly connect the pin, while a separate tongue punched out of the back-plate lies behind and above this wire loop and forms the retaining-catch for the pin-point. This makes a stronger connection for the pin that prevents it from being pulled out.

Having thus described my invention, what I claim as new, and desire to secure by Letters Patent, is—

A combined badge-pin and backing comprising a pin formed with a semicircular base having a flat loop bent to project inwardly at its extreme end, and a backing-plate extending across the center of the button and having in its edge at one side a hole through which the pin passes and having at a diametrical point a sheet-metal tongue punched out of the back-plate for retaining the pin-point, the loop of the pin-base being extended through the slot formed by punching out the tongue and turned inwardly to the center of the backing-plate and clamped or set tightly against the same substantially as described.

In testimony whereof I have signed my name to this specification in the presence of two subscribing witnesses.

GEORGE H. BROOKS.

Witnesses:
WM. HAMBRICK,
A. H. MARRET, Jr.